F. SHICKLE,

Assignor to himself, T. HOWARD & J. W. HARRISON.

Molding Pipe.

No. 8,562. Reissued Jan. 28, 1879.

ATTEST.

Saml. S. Boyd

Fredk Lear

INVENTOR.

Frederick Shickle.

by Chas. D. Moody atty.

2 Sheets—Sheet 2.

F. SHICKLE,

Assignor to himself, T. HOWARD & J. W. HARRISON.

Molding Pipe.

No. 8,562. Reissued Jan. 28, 1879.

ATTEST.

Frank S. Boyd

Fred K. Lear

INVENTOR

Frederick Shickle by Chas. D. Moody atty.

UNITED STATES PATENT OFFICE.

FREDERICK SHICKLE, OF ST. LOUIS, MISSOURI, ASSIGNOR TO HIMSELF, THOMAS HOWARD, AND JOHN W. HARRISON, OF SAME PLACE.

IMPROVEMENT IN MOLDING PIPES.

Specification forming part of Letters Patent No. 148,094, dated March 3, 1874; Reissue No. 8,562, dated January 28, 1879; application filed November 7, 1878.

*To all whom it may concern:*

Be it known that I, FREDERICK SHICKLE, of the city of St. Louis, Missouri, have made new and useful Improvements in Molding Pipes, of which the following is a full, clear, and exact description, reference being had to the annexed drawings, making part of this specification, in which—

Figure 1:
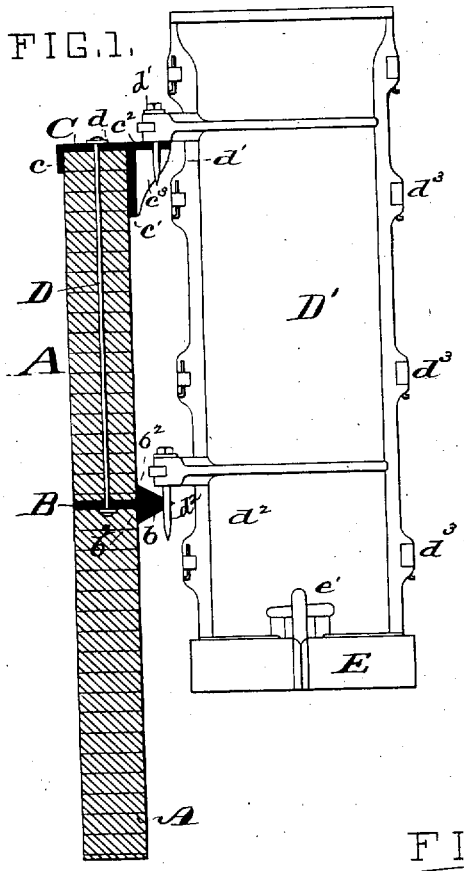
Figure 2:
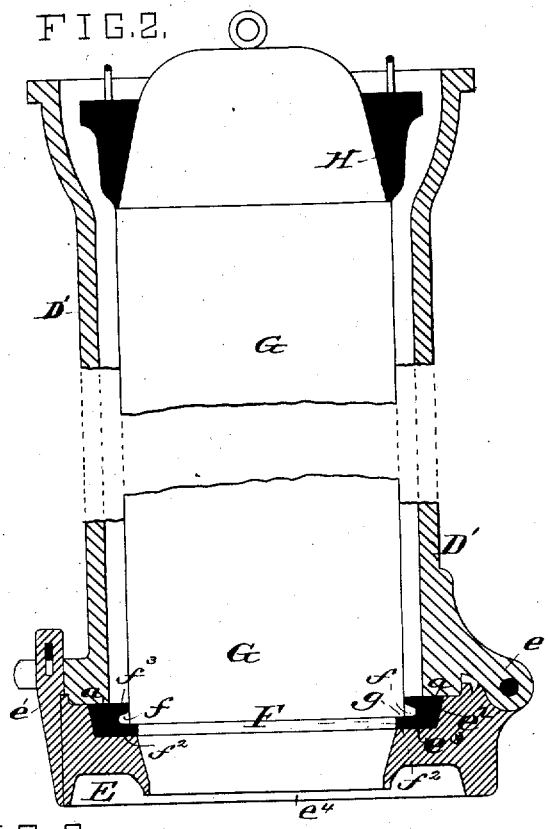
Figure 3:
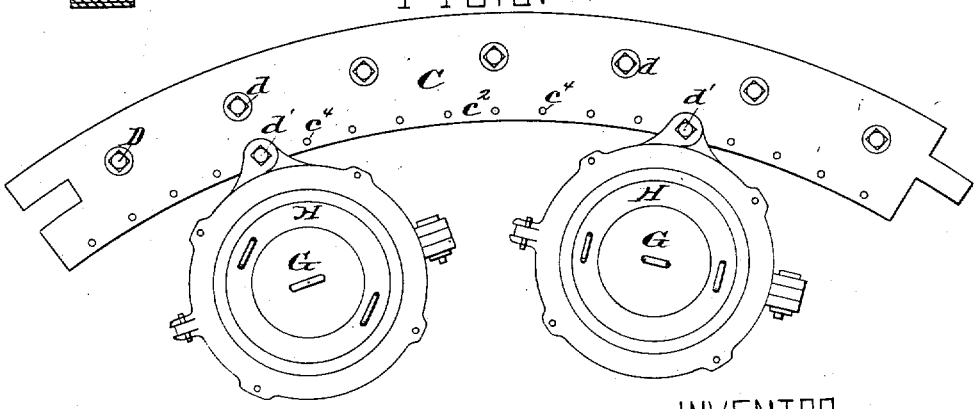
Figure 4:
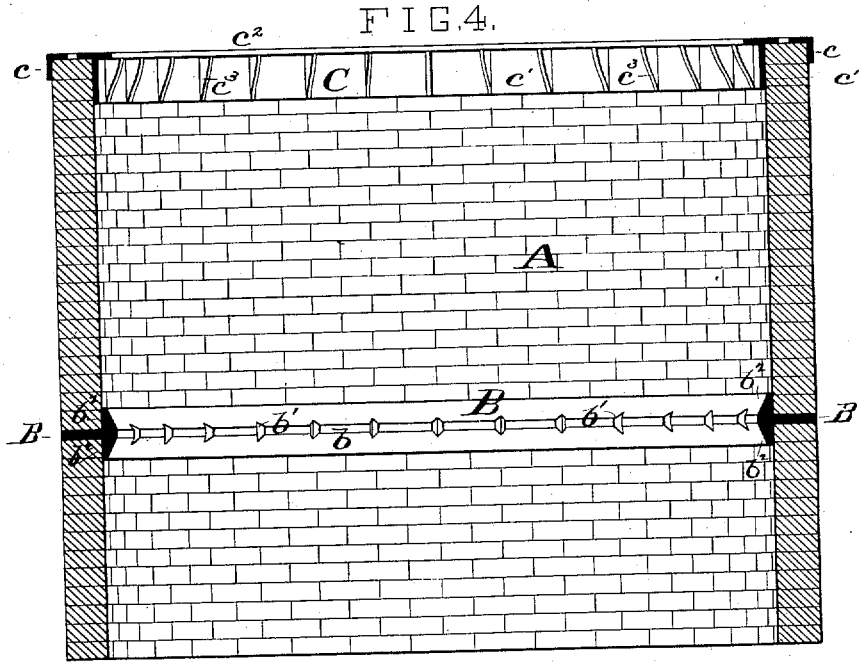
Figure 5:
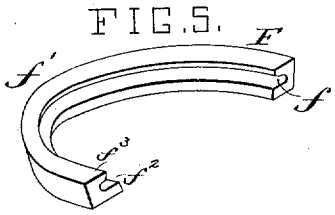

Figure 1 is a vertical cross-section of the pit-wall, and showing a flask in elevation and suspended in position upon the pit-wall; Fig. 2, a sectional elevation of the flask, showing the construction used in forming the bead of the pipe, (the pattern is also shown;) Fig. 3, a plan showing a portion of the pit-wall and flasks suspended thereon; Fig. 4, an elevation, from the inside, of a portion of the pit-wall; and Fig. 5, a view, in perspective, of one of the sections of the ring used in forming the bead of the pipe.

Like letters of like kind have reference to the same parts.

This invention relates to certain instrumentalities, hereinafter described, for molding and casting pipes, columns, and other long heavy castings, especially such as have a bead or flange thereon, and for removing the pipe, column, or casting, and the part used in forming the bead or flange from the flask, and for detaching such bead or flange forming part from the pipe, column, or casting when the latter is made.

That part of the improvement having reference to the pit-wall and the hanging of the flask thereon will be considered first.

In the annexed drawings, A represents the wall inclosing the pit in which the molding or formation of the pipes or columns is effected. The flask D′ is attached, in a vertical position, to the pit-wall, at the side thereof, and so as to bring the bottom of the flask above the bottom of the pit, as shown. The flask is also arranged to swing horizontally at the points of its attachment to the wall. This is carried out and the wall strengthened by providing the wall with two plates, C B, arranged, respectively, at the top and lower down in or upon the side of the wall. The top plate, C, is furnished with an outer, $c$, and an inner, $c^1$, vertical flange, fitted to cap the wall, as shown, and forming a bonnet thereon. The plate C projects inwardly from the inner face of the wall, to form a bearing-edge, $c^2$, from which the flask is immediately suspended. The edge $c^2$ is strengthened by brackets $c^3$ $c^3$. The edge is also perforated at $c^4$ $c^4$, to provide for the attachment of the flasks, which is done by means of pins $d^1$ $d^2$, which form the pintles of the upper hinges of the two halves of the flask, and which are extended downward to engage in the perforations $c^4$ $c^4$, as shown.

The lower plate has a V-shaped part, $b$, projecting inwardly from the inner face of the pit-wall, and having a series of notches, $b^1$ $b^1$, in its inner edge. The part $b$ constitutes the bearing for the lower ends of the flasks, the pintles $d^2$ $d^2$ of the lower hinges of the flasks being extended and made to engage in the notches $b^1$ $b^1$. The latter provide means for readily bringing the flask into a plumb position and steadying it therein, as required. For this purpose the notches $b^1$ $b^1$ are arranged to be plumb with the perforations $c^4$ $c^4$, respectively. The notches also allow the flask to be readily disengaged and swung out of its position.

The aim of the V shape of the part $b$ is to prevent the flask, as it is being lowered, hoisted, and otherwise manipulated, from catching upon the part. For a similar purpose the brackets $c^3$ $c^3$ are beveled, as shown, that thereby the flask, when being hoisted, may be directed away from the edge $c^2$.

The main portion of the plate D is built into the pit-wall. The shoulders $b^2$ $b^2$ enlarge the bearing of the part $b$ upon the pit-wall. The two plates B C are bolted together by anchor-rods D D, the rods being secured by nuts $d$ $d$. Connecting these plates strengthens the wall. The two parts of the flask are secured by means of the clamps $d^3$ $d^3$.

From the above it will be seen that the flasks can swing horizontally in their bearings in the plates B C, and that the pins $d^1$ $d^2$ also form the pivots upon which the two parts of the flask turn in opening and closing. Further, by reason of the flask being hung upon the pit-wall at the elevation shown, the bottom of the flask can be readily attached to the flask, adjusted, let down, or removed while the flask is in position upon the pit-wall. Furthermore, the space beneath the bottom of the flask, as the latter hangs upon the pit-wall, as shown, provides room for the casting to drop down, and thus be easily detached from the flask as the latter is opened, and without necessitating the removal of the flask from its position upon the pit-wall; for heretofore, in making pipes, the custom has been, after removing the flask from the drying-oven, to rest it either directly upon the bottom of the pit or upon a stand, which, in turn, rested upon the bottom of the pit, and then to make the casting. The casting being made, the flask containing it was lifted out of the pit, swung into a horizontal position, then unclamped, and the casting dropped out. The flask was then reclamped and put back in the pit. This trouble of removing the flask from the pit every time a casting is made is thus obviated by the present improvement.

The construction of the flask, and the molding and casting of the pipes, and the removal thereof from the flask, will now be described.

Heretofore, in casting in a vertical position pipes or other castings having a bead or flange thereon, such as a water or gas pipe, the practice has been as follows: The flask (which did not have a permanent bottom) was placed upon what is termed a "ramming-stand," which temporarily constituted the bottom of the flask. To enable the bead to be formed, the ramming-stand at and around the periphery of its central opening (corresponding to the central opening in the bottom of the present flask) is raised, forming in effect a circular flange, around the opening, and corresponding in shape to the upper portion of the ultimately-formed bead. In place of this fixed circular flange, a detachable ring was sometimes used. The pattern was then inserted and placed in position in the flask, its lower end fitting into the central opening above referred to, and against the circular flange. The flask was then rammed and the pattern removed. The flask was then detached from the ramming-stand and transferred to and connected with a second stand, which formed a bottom for the flask during the casting. When a loose ring was used in place of the fixed flange it was removed at the time of the transfer to the second stand. This last-named stand corresponds in its construction to the ramming-stand, saving that at the periphery of the central opening there is a depression instead of a raised edge. This depression, in connection with the space or impression left in the sand by the raised edge of the ramming-stand, (or by the loose ring named,) formed a space wherein the bead was formed.

From this practice several difficulties accrued. In transferring the flask from one stand to the other it was troublesome to properly fit the parts and retain the centers; for in casting pipes the sand is apt to collect in and upon the flask and flask-bottom, and to such an extent that the flask in practice cannot be made to fit accurately in the flask-bottom, but loosely therein. This "loose fit," or "play," as it is termed, occasions difficulty; for when the flank is transferred to the second stand, it is very liable to be placed more or less eccentrically thereon, resulting in the shell of the casting not being of uniform thickness.

In the present mode, as the flask is not disturbed after the operation of ramming and casting is commenced, the original center is preserved, and the space filled by the molten metal is always of uniform thickness throughout, whether the outer annular space occupied by the sand is uniform or not in thickness. The sand also was liable to be injured or broken away in the transfer, and in withdrawing the pattern and inserting the core, or in removing the detachable ring, and the operation was tedious and expensive.

To obviate these objections is my present aim. E represents the bottom of the flask, attached thereto, preferably, by the hinge $e$ and clamp $e^1$. The bottom thus forms part of the flask; and it can be readily swung open and closed, enabling the operator to reach the interior of the flask for the inspection or adjustment of any part therein, and allowing the flask to be opened after the casting is made, so that the latter can drop down from the flask.

In the bottom is a conical recess, $e^2$, forming the wall of a seat, $e^3$, Fig. 2, to receive and hold what is termed the "bead-ring" F. The latter may be called a "chill." It is formed in two or more sections, of the shape shown in Figs. 2 and 5, and to fit the recess and seat in the bottom E, as shown.

The aim in making the ring sectional is, that it may be detached from the casting after the latter is made, (for which purpose three or more sections are preferable,) and also that, as the pattern G is inserted in place, the various sections shall be spread thereby, and be made to properly seat themselves in the bottom E, bearing at their outer edges against the wall $e^2$, and at their inner edges against the pattern, and forming a continuous ring. Each section $f^1$ of the ring F is similarly grooved at $f$, so that when the sections are properly seated a continuous groove encircling the pattern is provided, in which a perfect bead can be formed.

The lower end (or that portion which comes below the ring F) of the pattern G is made tapering, and to fit the usual central opening, $e^4$, in the bottom E. The pattern above the ring F is of the usual shape, and opposite the ring it is of suitable size and shape to occupy the space (saving the groove $f$) within the ring.

Now, the latter is preferably made so that the portion thereof below the groove $f$ is smaller in diameter than the portion above the groove, the difference being, preferably, equal to the thickness of the shell of the pipe. Hence, after the pattern has been inserted and the bead-ring moved into place, the shoulder $g$ of the pattern rests upon the lower edge, $f^2$, of the ring, as shown. The sand is then rammed, resting upon the top of the ring F. The pattern prevents the sand from entering the groove $f$. The pattern is now withdrawn, and the usual core inserted and centered in the same opening, $e^4$, previously occupied by the pattern.

The shell is made to come above the ring F at $a$, to assist in holding the ring in place as the pattern is withdrawn. As the casting is made the molten metal falls upon the ring.

I claim—

1. The combination of the pattern G and the sectional bead-ring F, substantially as described.

2. A lower plate consisting of the plate B, provided with the V-shaped bearing $b$, having the notches $b^1$, as and for the purpose set forth.

3. The V-shaped bearing $b$, for the purpose described.

4. The top plate, C, having the flanges $c$ $c^1$, bearing-edge $c^2$, brackets $c^3$, and perforations $c^4$, as and for the purpose described.

5. The plate C, having the edge $c^2$ and the beveled brackets $c^3$, substantially as described.

6. The pit-wall A, provided with a lower plate, B, top plate, C, and connecting-rods D, in combination with the flask D′, the latter being suspended on said plates, substantially as and for the purpose described.

7. The pit-wall A, having the top plate, C, and lower bearing, $b$, said plate having the perforations $c^4$, and said bearing having the notches $b^1$, substantially as described.

8. The combination of the pit-wall A and bearing $b$, said bearing projecting from the wall and being notched, substantially as described.

9. The movable chill-ring F, in two or more sections, and containing the entire recess for forming the whole bead, in combination with the annular conical seat in the bottom plate, E, substantially as and for the purpose described.

10. In an apparatus for making pipes and other castings having a bead or flange thereon, a bead-ring made in sections and detachable from the flask, for the purpose described.

11. In an apparatus for making pipes and other castings having a bead or flange thereon, a sectional bead-ring movable in the flask, for the purpose described.

12. In an apparatus for making pipes and other castings having a bead or flange thereon, a detachable bead-ring containing the entire recess for forming the whole bead, in combination with a suitable support or seat for such ring.

13. In an apparatus for making pipes and other castings having a bead or flange thereon, a detachable bead-ring containing a recess for forming all of the bead.

14. The bead-ring F, in two or more sections, and detachable from the flask, and containing the entire recess for forming the whole bead, in combination with a seat, $e^3$, in the plate E, substantially as described.

15. In an apparatus for making pipes and other castings having a bead or flange thereon, the combination of a pattern having a tapering end, a sectional bead-ring, and an annular seat for such ring, to enable the parts of such ring to be properly adjusted in the seat by said tapering end.

16. In an apparatus for making pipes and other castings having a bead or flange thereon, a bead-ring detachable from the flask-bottom, and having the inner edge of its lower part arranged to abut against the core, and the inner edge of its upper part arranged to abut against the pattern, to prevent the molten metal, as the casting is made, from falling directly upon the flask-bottom.

17. In an apparatus for making pipes and other castings having a bead or flange thereon, a sectional bead-ring, in combination with a seat, $e^3$, in the bottom of the flask.

18. In an apparatus for making pipes and other castings having a bead or flange thereon, the combination of a flask, a detachable flask-bottom, and a sectional bead-ring having a recess therein, and being detachable from said flask and bottom.

19. In an apparatus for making pipes and other castings having a bead or flange thereon, a sectional bead-ring movable in and detachable from the flask-bottom.

20. The bead-ring F, having the vertical face $f^2$ below the groove $f$, substantially as described, and to enable the core-pattern to more readily form the joint with the bead-ring.

21. The combination of the flask D′, bottom E, and the detachable ring F, the shell of the flask being made to come above the ring at $a$, for the purpose described.

FREDERICK SHICKLE.

Witnesses:
JOHN W. HARRISON,
CHAS. D. MOODY.